(12) United States Patent
Manabe et al.

(10) Patent No.: US 9,889,765 B2
(45) Date of Patent: Feb. 13, 2018

(54) FUEL CELL SYSTEM

(75) Inventors: Kota Manabe, Toyota (JP); Yutaka Tano, Toyota (JP); Tomohiko Kaneko, Okazaki (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 487 days.

(21) Appl. No.: 14/414,948

(22) PCT Filed: Jul. 20, 2012

(86) PCT No.: PCT/JP2012/068454
§ 371 (c)(1),
(2), (4) Date: Jan. 15, 2015

(87) PCT Pub. No.: WO2014/013606
PCT Pub. Date: Jan. 23, 2014

(65) Prior Publication Data
US 2015/0217660 A1 Aug. 6, 2015

(51) Int. Cl.
*B60L 1/00* (2006.01)
*B60L 11/18* (2006.01)
(Continued)

(52) U.S. Cl.
CPC ........... *B60L 11/1887* (2013.01); *B60L 1/003* (2013.01); *B60L 3/003* (2013.01); *B60L 3/0038* (2013.01); *B60L 3/04* (2013.01); *B60L 11/123* (2013.01); *B60L 11/14* (2013.01); *H01M 8/0494* (2013.01); *H01M 8/04619* (2013.01); *H01M 8/04626* (2013.01); *H01M 8/04858* (2013.01);
(Continued)

(58) Field of Classification Search
CPC ............................. B60L 11/1887; B60L 1/00
USPC .......................................................... 307/23
See application file for complete search history.

(56) References Cited

U.S. PATENT DOCUMENTS

2004/0083039 A1* 4/2004 Hunt .................. B60L 11/1887
 701/22
2006/0055349 A1* 3/2006 Nakayama ............ B60L 11/123
 318/400.18
(Continued)

FOREIGN PATENT DOCUMENTS

JP 2009-163948 A 7/2009
JP 2009-283172 A 12/2009
(Continued)

*Primary Examiner* — Rexford Barnie
*Assistant Examiner* — Joseph Inge
(74) *Attorney, Agent, or Firm* — Andrews Kurth Kenyon LLP (57) ABSTRACT

A fuel cell system that includes a fuel cell and a secondary battery, each acting as a power supply source. A first converter a second converter is provided between the fuel cell and the secondary battery and first and second loads. A first inverter is provided between the first and second converters and the first load and a second inverter is provided between the first and second converters and the second load. A first controller controls an output of the fuel cell by controlling the first converter, and a second controller is configured separately from the first controller. If one of the first controller and the second controller receives the failure information sent from the other, the first controller or the second controller that has received the failure information stops operation of the control target thereof.

12 Claims, 4 Drawing Sheets

(51) Int. Cl.
*B60L 3/00* (2006.01)
*B60L 3/04* (2006.01)
*B60L 11/12* (2006.01)
*B60L 11/14* (2006.01)
*H01M 8/04828* (2016.01)
*H01M 16/00* (2006.01)
*H01M 8/04537* (2016.01)
*H01M 8/04858* (2016.01)
*H02M 7/04* (2006.01)
*H02M 7/44* (2006.01)

(52) U.S. Cl.
CPC ..... *H01M 8/04947* (2013.01); *H01M 16/006* (2013.01); *H02M 7/04* (2013.01); *H02M 7/44* (2013.01); *B60L 2210/10* (2013.01); *B60L 2210/40* (2013.01); *B60L 2240/36* (2013.01); *H01M 2250/20* (2013.01); *Y02T 10/6217* (2013.01); *Y02T 10/7005* (2013.01); *Y02T 10/7077* (2013.01); *Y02T 10/7216* (2013.01); *Y02T 10/7241* (2013.01); *Y02T 90/16* (2013.01); *Y02T 90/32* (2013.01); *Y02T 90/34* (2013.01); *Y10T 307/344* (2015.04)

(56) References Cited

U.S. PATENT DOCUMENTS

| | | | |
|---|---|---|---|
| 2006/0222910 A1* | 10/2006 | Aoyagi | B60H 1/00392 429/432 |
| 2012/0069613 A1* | 3/2012 | Nakagawa | H02M 7/53871 363/78 |
| 2015/0191133 A1* | 7/2015 | Okamura | H02M 3/1588 307/9.1 |

FOREIGN PATENT DOCUMENTS

| | | | | |
|---|---|---|---|---|
| JP | 2010-135258 A | | 6/2010 | |
| JP | 2011-228294 A | | 11/2011 | |
| JP | 2011228294 A | * | 11/2011 | |
| WO | 2010-143028 A1 | | 12/2010 | |
| WO | WO 2010143028 A1 | * | 12/2010 | H02M 3/1584 |

* cited by examiner

| SIGNAL NAME | CONTENT | DETAILS |
|---|---|---|
| MFINV | MOTOR INVERTER FAILURE | IGBT OVERCURRENT, OVERHEAT, DRIVE IC OVERHEAT, POWER SOURCE ABNORMALITY |
| GFINV | GENERATOR INVERTER FAILURE | IGBT OVERCURRENT, OVERHEAT, DRIVE IC OVERHEAT, POWER SOURCE ABNORMALITY |
| FCV | CONVERTER FAILURE | IGBT OVERCURRENT, OVERHEAT, DRIVE IC OVERHEAT, POWER SOURCE ABNORMALITY |
| OVH | INVERTER INPUT OVERVOLTAGE FAILURE | OVERVOLTAGE IN INVERTER INPUT PORT VOLTAGE |
| OVL | CONVERTER INPUT OVERVOLTAGE FAILURE | OVERVOLTAGE IN BAT CONVERTER INPUT PORT VOLTAGE |
| mfinv-rg | MFINV ENABLING SIGNAL | CPU OUTPUT CONTROL SIGNAL |
| gfinv-rg | GFINV ENABLING SIGNAL | CPU OUTPUT CONTROL SIGNAL |
| fcv-rg | FCV ENABLING SIGNAL | CPU OUTPUT CONTROL SIGNAL |
| ovh-rg | OVH ENABLING SIGNAL | CPU OUTPUT CONTROL SIGNAL |
| ovl-rg | OVL ENABLING SIGNAL | CPU OUTPUT CONTROL SIGNAL |
| isdn-rg | ISDN ENABLING SIGNAL | CPU OUTPUT CONTROL SIGNAL |
| fsdn-rg | FSDN ENABLING SIGNAL | CPU OUTPUT CONTROL SIGNAL |
| MSDN | MOTOR SHUTDOWN | STOP SIGNAL |
| GSDN | GENERATOR SHUTDOWN | STOP SIGNAL |
| CSDN | CONVERTER SHUTDOWN | STOP SIGNAL |
| ISDN | INVERTER SHUTDOWN | STOP SIGNAL |
| FSDN | FC CONVERTER SHUTDOWN | STOP SIGNAL |
| FOVH | FC OVERVOLTAGE ABNORMALITY | OVERVOLTAGE IN FC STEP-UP CONVERTER OUTPUT PORT |
| FLVL | FC LOW VOLTAGE ABNORMALITY | LOW VOLTAGE IN FC STEP-UP CONVERTER INPUT PORT |
| FCVU | FC STEP-UP CONVERTER U-PHASE FAILURE | OVERCURRENT, OVERHEAT, POWER SOURCE ABNORMALITY, DRIVE IC OVERHEATE |
| FCVV | FC STEP-UP CONVERTER V-PHASE FAILURE | OVERCURRENT, OVERHEAT, POWER SOURCE ABNORMALITY, DRIVE IC OVERHEATE |
| FCVW | FC STEP-UP CONVERTER W-PHASE FAILURE | OVERCURRENT, OVERHEAT, POWER SOURCE ABNORMALITY, DRIVE IC OVERHEATE |
| FCCX | FC STEP-UP CONVERTER X-PHASE FAILURE | OVERCURRENT, OVERHEAT, POWER SOURCE ABNORMALITY, DRIVE IC OVERHEATE |
| fovh-rg | FOVH ENABLING SIGNAL | CPU OUTPUT CONTROL SIGNAL |
| flvl-rg | FLVL ENABLING SIGNAL | CPU OUTPUT CONTROL SIGNAL |
| inv-sdn | INVERTER SHUTDOWN SIGNAL | CPU OUTPUT CONTROL SIGNAL |
| ufc-sdn | FC STEP-UP CONVERTER U-PHASE SHUTDOWN SIGNAL | CPU OUTPUT CONTROL SIGNAL |
| vfc-sdn | FC STEP-UP CONVERTER V-PHASE SHUTDOWN SIGNAL | CPU OUTPUT CONTROL SIGNAL |
| wfc-sdn | FC STEP-UP CONVERTER W-PHASE SHUTDOWN SIGNAL | CPU OUTPUT CONTROL SIGNAL |
| xfc-sdn | FC STEP-UP CONVERTER X-PHASE SHUTDOWN SIGNAL | CPU OUTPUT CONTROL SIGNAL |
| SDNU | U-PHASE SHUTDOWN SIGNAL | STOP SIGNAL |
| SDNV | V-PHASE SHUTDOWN SIGNAL | STOP SIGNAL |
| SDNW | W-PHASE SHUTDOWN SIGNAL | STOP SIGNAL |
| SDNX | X-PHASE SHUTDOWN SIGNAL | STOP SIGNAL |

FIG.4

FUEL CELL SYSTEM

CROSS-REFERENCE TO RELATED APPLICATION

This is a national phase application based on the PCT International Patent Application No. PCT/JP2012/068454 filed Jul. 20, 2012, the entire contents of which are incorporated herein by reference.

TECHNICAL FIELD

The present invention relates to a fuel cell system having a plurality of controllers for controlling converters and inverters.

BACKGROUND ART

FC systems using two power supply sources—a fuel cell (hereinafter called an "FC") and a secondary battery—and FC vehicles equipped with such FC systems have been known heretofore. In particular, if a secondary battery is installed for the purpose of power regeneration, that purpose can be fully achieved by a secondary battery having a small capacity relative to the FC.

However, in such FC systems having two power supply sources, if a failure occurs in any of the system components, such as an FC, a secondary battery, a drive motor that receives power supply from the FC and/or the secondary battery, and an inverter that controls the drive motor, and if some system components are unable to provide outputs, this results in an imbalance in outputs.

For example, in the case where an FC supplies an output of 100 kW to a 100 kW drive motor, if a failure occurs in the drive motor for some reason, a 100 kW output from the FC will flow into a secondary battery which is provided for regeneration.

In a system that adopts the configuration where a fuse is blown out if the entire output from the FC flows into the secondary battery due to the failure of the drive motor, in other words, in a system that adopts the configuration where individual system components constituting the FC system independently detect failures and stop for the self-protection, a failure in one system component may cause a failure in another system component, that is, there is the risk of so-called concurrent failures.

As a measure for such concurrent failures, for example, Patent Document 1 discloses a technique in which, if an overcurrent occurs in an FC step-up converter disposed between an FC and a load, the input voltage of a drive inverter disposed between the load and the step-up converter is restricted to be equal to or lower than a predetermined overvoltage threshold, so that any concurrent failures of the drive inverter, etc., can be suppressed even if an open-circuit failure occurs in a switching device of the step-up converter.

PRIOR ART REFERENCE

Patent Document

Patent Document 1: JP2009-283172 A

SUMMARY OF THE INVENTION

Problem to be Solved by the Invention

Some FC systems comprise: an FC and a secondary battery; an FC converter provided between the FC and a first load and a secondary battery converter provided between the secondary battery and a second load; and a first inverter provided between the FC converter and the first load and a second inverter provided between the secondary battery converter and the second load, wherein a controller for controlling an output of the FC is configured separately from a controller for controlling outputs supplied to the first and second inverters, including an output supplied from the secondary battery, and the controllers are controlled separately.

In such FC systems, if a failure occurs in a system component controlled by one controller and if the transfer of the failure information to the other controller is delayed, a concurrent failure may be caused in a system component controlled by the other controller.

In particular, if each controller independently controls the relevant failure detection function or self-protection function, concurrent failures cannot be avoided when the failure detection information is not shared by the respective controllers.

The present invention has been made in view of the above-described circumstances, and an object of the present invention is to provide an FC system effective for suppressing concurrent failures.

Means for Solving the Problem

In order to achieve the above object, an FC system according to the present invention comprises:

an FC and a secondary battery, each acting as a power supply source;

a first converter and a second converter provided between the FC and the secondary battery and first and second loads;

a first inverter provided between the first and second converters and the first load and a second inverter provided between the first and second converters and the second load;

a first controller that controls an output of the FC by controlling the first converter;

a second controller configured separately from the first controller, the second controller controlling the second converter, the first inverter and the second inverter to thereby control outputs supplied to the first inverter and the second inverter, including an output from the secondary battery, wherein the first controller and the second controller are connected so as to be able to communication with each other regarding failure information on respective control targets, and wherein if one of the first controller and the second controller receives the failure information sent from the other, operation of the control target of the first controller or the second controller that has received the failure information is stopped.

In the FC system having the above configuration, if a failure is detected in, for example, a system component controlled by the first controller, it is possible to simultaneously stop the operation of the system component(s) controlled by the second controller. Conversely, if a failure is detected in a system component controlled by the second controller, it is possible to simultaneously stop the operation of the system component(s) controlled by the first controller.

As a result, even if a failure occurs in a particular system component, any concurrent failures of the system components that are not directly related to the failure can be suppressed.

The second controller may be configured to control the first inverter, the second inverter and the second converter with a physically single controller. Alternatively, a controller may be provided for each of the first inverter, the second inverter and the second converter such that the three controllers are connected to each other to constitute the second controller.

Alternatively, a controller for controlling one of the first inverter, the second inverter and the second converter, and a controller for controlling the remaining two of the above may be connected to constitute the second controller.

In the above configuration, if a failure is detected in any of the first converter, the second converter, the first inverter or the second inverter, the first controller and the second controller may be configured to:

stop the operation of the first converter, the second converter, the first inverter and the second inverter if the failure is detected in the second converter; and stop the operation of the first converter, the first inverter and the second inverter if the failure is detected in any of the first converter, the first inverter or the second inverter, and then stop the operation of the second converter after a predetermined time has passed from the stop of the operation of the first converter, the first inverter and the second inverter.

In the above FC system, the second converter is exempted from the simultaneous stopping, excluding the case where a failure occurs in the second converter. Specifically, only the second converter is stopped after a predetermined time has passed from the timing of the simultaneous stopping of the other control targets.

As a result, it is possible to control counter electromotive voltage, which may occur after the first inverter and the second inverter stop simultaneously, by using the second converter, and to thereby suppress any failure of semiconductor devices due to such counter electromotive voltage.

In the above configuration, a judgment part may be provided for judging the cause of the failure, and the first controller and the second controller may be configured to restart at least one of the first converter, the second converter, the first inverter and the second inverter based on a result of judgment by the judgment part.

With this configuration, after avoiding concurrent failures, the system in a stop state can be safely restarted by using only the appropriate system components for the restart.

For example, in the above configuration, if the first converter is a multi-phase converter comprising a step-up circuit part having two or more phases, and if a failure in the first converter is caused by an overcurrent abnormality in a particular phase and that abnormality is a first-time overcurrent abnormality, the first controller and the second controller may be configured to restart the first converter, the second converter, the first inverter and the second inverter.

Further, if the first converter is a multi-phase converter comprising a step-up circuit part having two or more phases, and if a failure in the first converter is caused by an overcurrent abnormality in a particular phase and that abnormality is a second or subsequent time overcurrent abnormality, the first controller and the second controller may be configured to restart all phases of the first converter excluding the particular phase, the second converter, the first inverter and the second inverter.

Further, if the first converter is a multi-phase converter comprising a step-up circuit part having two or more phases, and if a failure in the first converter is caused by an overheat abnormality or a circuit abnormality in a particular phase, the first controller and the second controller may be configured to restart the remaining phases other than the particular phase in the first converter, the second converter, the first inverter and the second inverter.

Further, the first controller and the second controller may be configured to restart the second converter, the first inverter and the second inverter if a failure in the first converter is caused by a circuit abnormality in a circuit on the output port side of the first converter.

Further, if a failure in the first converter is caused by any of an overvoltage abnormality on the output port side of the first converter, a low voltage abnormality on the input port side of the first converter, or a circuit abnormality in a circuit on the input port side of the first converter, the first controller and the second controller may be configured to block an output from the FC to the first and second loads and thereafter restart the second converter, the first inverter and the second inverter.

In the above configuration, if the first controller performs failure diagnosis for determining the existence of the failure, the first controller and the second controller may be configured to prohibit the restart until the failure diagnosis has been completed.

For example, if the failure in the first converter is caused by an overcurrent abnormality in a particular phase, there are some cases where such cause of the failure will be resolved and the first converter will be recovered to a normal condition when a certain time has passed after the stopping of the operation of the first converter. At that time, the first converter, etc., can be restarted in terms of hardware; nevertheless, the above configuration prohibits (or suspends) the restart until the completion of the failure diagnosis, thereby improving the reliability of the FC system.

In the above configuration, if the first controller performs failure diagnosis for determining the existence of the failure, the first controller and the second controller may be configured to permit the restart after the failure diagnosis has been completed.

For example, if the failure in the first converter is caused by any of an overheat abnormality or a circuit abnormality in a particular phase, a circuit abnormality in a circuit on the output port side of the first converter, an overvoltage abnormality on the output port side of the first converter, a low voltage abnormality on the input port side of the first converter, or a circuit abnormality in a circuit on the input port side of the first converter, such cause of the failure will not be resolved so that the first converter cannot be recovered to a normal condition even after a certain time has passed after the stopping of the operation of the first converter, or it will take a long time for the first converter to be recovered to a normal condition.

Since the above configuration permits the restart of the first converter, etc., after the completion of the failure diagnosis, the restart can be done more quickly and securely.

Effect of the Invention

According to the present invention, it is possible to provide an FC system effective for the suppression of concurrent failures.

BRIEF DESCRIPTION OF THE DRAWINGS

FIG. 3 is a diagram explaining the content of the failure signals and shutdown signals shown in FIG. 2.

DESCRIPTION OF REFERENCE NUMERALS

11 FC system (fuel cell system)
12 FC (fuel cell)
13 Drive motor (first load)
14 Drive motor (second load)
15 FC-CVT (FC step-up converter, first converter)
16 Drive IVT (drive inverter, first inverter)
17 Auxiliary device IVT (auxiliary device inverter, second inverter)
20 BAT (secondary battery)
22 BAT-CVT (battery step-up converter, second converter)
30 CTRL (controller)
31 C-CTRL (FC step-up converter controller, first controller, judgment part)
32 I-CTRL (inverter controller, second controller, judgment part)

Mode for Carrying out the Invention

Hereinafter, an embodiment of the FC system according to the present invention will be described with reference to the attached drawings. The present embodiment describes an example in which the FC system according to the present invention is used as an on-vehicle power generation system for an FC vehicle (FCHV: Fuel Cell Hybrid Vehicle).

Figure 1:
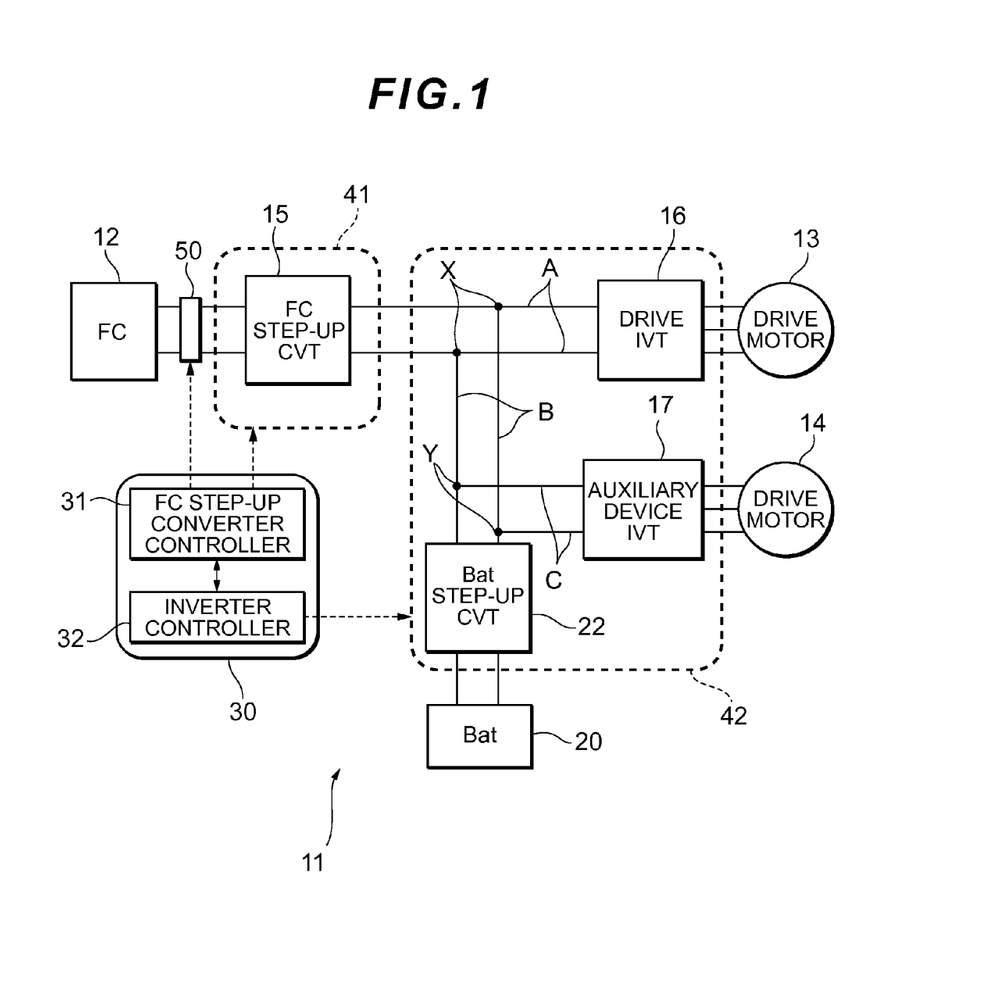
FIG. 1 is a configuration diagram of an FC system according to an embodiment of the present invention.

As illustrated in FIG. 1, an FC system 11 of the present embodiment has, as power supply sources for loads, an FC 12 which may be, for example, a polymer electrolyte type fuel cell, and a BAT 20.

The FC 12 and a drive motor (first load) 13 for enabling the vehicle to travel are connected to each other via a power supply path A. On this power supply path A, an FC relay 50, an FC-CVT (first converter) 15 and a drive IVT 16 are provided in this order from the FC 12 side. The FC relay 50 may be provided between the FC-CVT 15 and connection points X which will be described later.

The FC-CVT 15 is a direct current voltage converter and it adjusts a direct current voltage input from the FC 12 and outputs the resulting voltage toward the drive IVT 16. The drive motor 13 is, for example, a three-phase alternating current motor, and the drive IVT 16 converts a direct current into a three-phase alternating current and supplies the resulting current to the drive motor 13.

A power supply path B is connected to the power supply path A. The connection points X between the power supply path A and the power supply path B are located between the FC-CVT 15 and the drive IVT 16. One end of the power supply path B is connected to the BAT 20, and a relay (not shown in the drawing) and a BAT-CVT (second converter) 22 are provided between the BAT 20 and the connection points X in this order from the BAT 20 side.

In accordance with the control signals from a CTRL 30, the BAT 20 can be charged with an excess portion of the output power from the FC 12 or with regenerative power of the drive motor 13, and can also supply power for any shortage occurring when the output power from the FC 12 is insufficient for the required power for driving the drive motors 13 and 14.

The BAT-CVT 22 is a direct current voltage converter and it has functions of: adjusting a direct current voltage input from the BAT 20 and outputting the resulting voltage toward the drive motors 13 and 14; and adjusting a direct current voltage input from the FC 12 or the drive motor 13 and outputting the resulting voltage to the BAT 20. With these functions of the BAT-CVT 22, charging/discharging of the BAT 20 can be performed.

A power supply path C is connected to the higher voltage side of the power supply path B. Connection points Y between the power supply path B and the power supply path C are located between the connection points X and the BAT-CVT 22. One end of the power supply path C is connected to a motor (second load) 14. The drive motor 14 is, for example, a three-phase alternating current motor, acting as a drive motor for an air compressor which pumps out air (oxidant gas) to the FC 12. An auxiliary device IVT 17 is provided between the drive motor 14 and the connection points Y. The auxiliary device IVT 17 converts a direct current into a three-phase alternating current and supplies the resulting current to the drive motor 14.

In the present embodiment, although not shown in the drawing, the following components: an auxiliary device motor that drives a hydrogen pump for allowing a hydrogen off-gas discharged from a hydrogen gas flow path of the FC 12 to flow back to the FC 12; an auxiliary device motor that drives a cooling water pump for circulating cooling water to be used for temperature adjustment of the FC 12; and an auxiliary device inverter that converts a direct current into a three-phase alternating current and supplies the resulting current to those auxiliary device motors, are provided on the lower voltage side (BAT 20 side) of the power supply path B.

The CTRL 30 is a computer system for the overall control of the FC system 11 and has, for example, a CPU, RAM, ROM, etc. The CTRL 30 receives inputs of signals (e.g., signals indicating the degree of opening of the accelerator, signals indicating the vehicle speed, and signals indicating an output current or output voltage of the FC 12; FIG. 1 shows only some of those signals) from various sensors and calculates the required power from all of the loads, including the drive motors 13 and 14 as well as the auxiliary device motors.

The CTRL 30 in the present embodiment has a C-CTRL 31 that controls an output voltage of the FC 12 (in other words, an input voltage to the FC-CVT 15) and an I-CTRL 32 that controls an output voltage from the BAT 20 (in other words, an input voltage to the BAT-CVT 22) and an output voltage supplied to the drive IVT 16 and auxiliary device IVT 17.

As shown by the dashed line border in FIG. 1, the FC-CVT 15 belongs to a system component group controlled by the C-CTRL 31 (hereinafter referred to as a control target group 41), while the BAT-CVT 22, the drive IVT 16 and the auxiliary device IVT 17 belong to a system component group controlled by the I-CTRL 32 (hereinafter referred to as a control target group 42).

The C-CTRL 31 and the I-CTRL 32 are connected so as to be able to communicate with each other. For example, if a failure occurs in a system component belonging to one control target group 41/42, the failure information is sent from the corresponding controller C-CTRL 31/I-CTRL 32 to the other controller I-CTRL 32/C-CTRL 31.

Examples of loads other than the drive motor 13 and 14 and the auxiliary device motors include: electric power consumed by apparatuses (not shown in the drawing) necessary for the travel of the vehicle (transmission, wheel controller, steering device, suspension, etc.); and electric power consumed by apparatuses (not shown in the drawings) arranged in the passenger space (air conditioner, lighting devices, audio system, etc.).

The CTRL 30 determines an output power distribution between the FC 12 and the BAT 20 and calculates power generation command values. More specifically, when the CTRL 30 calculates a power required to be obtained from the FC 12 and from the BAT 20, the CTRL 30 controls the action of the FC-CVT 15 and BAT-CVT 22 so that the calculated required power can be obtained from the FC 12 and BAT 20.

During a normal operation, the C-CTRL 31 in the CTRL 30 causes the FC-CVT 15 to control an output voltage of the FC 12, while the I-CTRL 32 causes the BAT-CVT 22 to control an output voltage toward the drive motors 13 and 14, in other words, an input voltage to the drive IVT 16 and the auxiliary device IVT 17. If one controller C-CTRL 31/I-CTRL 32 detects a failure in a system component belonging to the corresponding control target group 41/42, the failure information is sent to the other controller I-CTRL 32/C-CTRL 31.

The other controller I-CTRL 32/C-CTRL 31 that has received the failure information sent from the one controller C-CTRL 31/I-CTRL 32 performs various types of simultaneous shutdown (simultaneous operation stopping) processing in accordance with which system component has the failure. The shutdown processing will be described in detail below.

Figure 2:
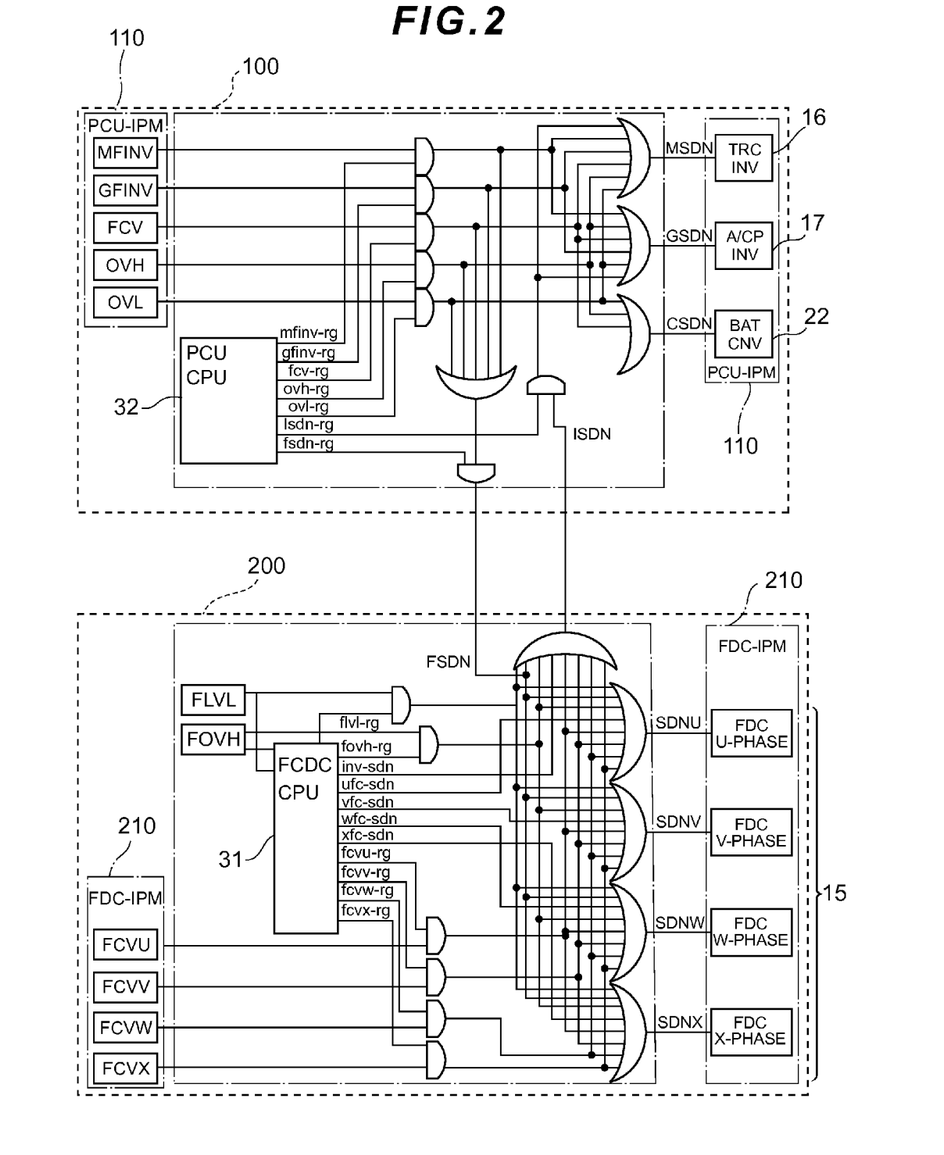
FIG. 2 is a diagram explaining how the simultaneous operation stopping of an FC step-up converter, a drive inverter, an auxiliary device inverter and a battery step-up converter is performed by way of mutual communication of failure information between an FC step-up converter controller and an inverter controller.

FIG. 2 is a diagram showing one example of the shutdown system for the FC system 11 according to the present embodiment. Reference numeral 100 denotes a first shutdown system in which the shutdown of the drive IVT 16, the auxiliary device IVT 17 and the BAT-CVT 22 and the cancellation thereof are controlled by the I-CTRL 32. Reference numeral 200 denotes a second shutdown system in which the shutdown of the FC-CVT 15 and the cancellation thereof are controlled by the C-CTRL 31.

Usually, a functional part, called an IPM (intelligent power module) is incorporated into converters and inverters. The purpose of this is as follows: since semiconductor devices (e.g., IGBTs) within a converter or inverter are very susceptible to abnormalities, such as overheat, overcurrent and overvoltage, and are easy to fail, an abnormality detection circuit for detecting such abnormalities is incorporated into an IGBT module in advance when designing the IGBT module, so that power conduction to the relevant circuit will be immediately cut off when an abnormality is detected, thereby suppressing any failure of the IGBT.

As shown in FIG. 2, in the present embodiment, a PCU-IPM 110 is incorporated with regard to the control target group 41 including the drive IVT 16, the auxiliary device IVT 17 and the BAT-CVT 22, while a FDC-IPM 210 is incorporated with regard to the control target group 42 including the FC-CVT 15. It should be noted here that FIG. 2 shows an example in which the FC-CVT 15 is a multi-phase converter comprising a step-up circuit part having four phases, i.e., the U-, V-, W- and X-phases.

Now, a typical example of the shutdown action controlled by the C-CTRL 31 and I-CTRL 32 will be specifically described below, with reference to FIG. 2 and FIG. 3 in which the reference signs used in FIG. 2 are listed up with the descriptions thereof.

In FIG. 3, a signal name written by capital letters of the alphabet and having no "-rg," such as MFINV, GFINV and FCV, indicates a signal having either a signal value meaning a shutdown command (stop signal) (hereinafter, such signal value will sometimes be referred to as a "shutdown signal value" and "a signal having a shutdown signal value" will sometimes be referred to simply as "a shutdown signal") or a signal value meaning a command to cancel shutdown (signal to cancel the stopping) (hereinafter, such signal value will sometimes be referred to as a "shutdown-cancel signal value" and "a signal having a shutdown-cancel signal value" will sometimes be referred to simply as "a shutdown-cancel signal").

Meanwhile, a signal name written by small letters of the alphabet and having "-rg," such as mfinv-rg, gfinv-rg and fcv-rg, indicates a signal which, even if a signal value meaning a shutdown command as described above is output, masks the signal value so as to disable the shutdown command.

<MFINV>

In the first shutdown system 100, if a failure occurs in, for example, the drive IVT 16, that failure is detected by the PCU-IPM 110 and, in response to the detection of the failure of the drive IVT 16, a signal MFINV having a shutdown signal value is output. Upon the output of the shutdown signal MFINV, signals MSDN and GSDN are generated which have a shutdown signal value for the drive motors 13 and 14, respectively. The generated shutdown signals MSDN and GSDN are output to the drive IVT 16 and the auxiliary device IVT 17, respectively, so as to stop the operation of the drive motors 13 and 14.

At that time, a signal CSDN having a shutdown-cancel signal value is output to the BAT-CVT 22. Further, when the shutdown signal MFINV is output in the first shutdown system 100 and a signal FSDN having a shutdown signal value for the control target group 41 is generated in response to the output of the shutdown signal MFINV, the generated shutdown signal FSDN is sent from the first shutdown system 100 to the second shutdown system 200.

In response, signals SDNU, SDNV, SDNW and SDNX each having a shutdown signal value for the U-, V-, W- and X-phases of the FC-CVT 15, respectively, are generated in the second shutdown system 200, and the generated shutdown signals SDNU to SDNX are respectively output to the U- to X-phases, thereby stopping the operation of the FC-CVT 15.

As described above, in the present embodiment, if a failure is detected in the drive IVT 16, the operation of the system components belonging to the same control target group 42, excluding the BAT-CVT 22, i.e., the operation of the drive IVT 16 and the auxiliary device IVT 17 is stopped simultaneously and, furthermore, the operation of the FC-CVT 15 which belongs to the other control target group 41 is also stopped simultaneously. Accordingly, even if a failure occurs in the drive IVT 16, a concurrent failure in the auxiliary device IVT 17 or in the FC-CVT 15 can be suppressed.

The present embodiment is configured to simultaneously stop other system components along with the faulty system component in order to suppress any concurrent failure. However, only the BAT-CVT 22 is exempted from such simultaneous stopping. Specifically, only the BAT-CVT 22 will be stopped after a predetermined time has passed from the timing of the above simultaneous stopping.

As a result, it is possible to control counter electromotive voltage, which may occur after the drive IVT 16 and auxiliary device IVT 17 stop simultaneously, by using the BAT-CVT 22 and to thereby suppress any failure of semiconductor devices due to such counter electromotive voltage.

<GFINV>

In the first shutdown system 100, if a failure occurs in the auxiliary device IVT 17, that failure is detected by the PCU-IPM 110 and, in response to the detection of the failure, a signal GFINV having a shutdown signal value is output. Upon the output of the shutdown signal GFINV, shutdown signals MSDN and GSDN are output. After that, the simultaneous stopping action of the system components is the same as in the above-described case where a failure occurs in the drive IVT 16 (see the <MFINV> section above) and thus, the description of the action in this case and the effects thereof will be omitted.

<FCV>

Next, the case where a failure occurs in the BAT-CVT 22 in the first shutdown system 100 will be described. In that case, that failure is detected by the PCU-IPM 110 and, in response to the detection of the failure of the BAT-CVT 22, a signal FCV having a shutdown command value is output.

When the shutdown signal FCV is output, signals MSDN, GSDN and CSDN each having a shutdown signal value for the drive motor 13, the drive motor 14 and the BAT-CVT 22, respectively, are output and those shutdown signals MSDN, GSDN and CSDN are output to the drive IVT 16, the auxiliary device IVT 17 and the BAT-CVT 22, respectively, thereby stopping the operation of the drive motors 13 and 14 and the BAT-CVT 22.

Further, similarly to the above-described case where a failure occurs in the drive IVT 16, when the shutdown signal FCV is output in the first shutdown system 100, a signal FSDN having a shutdown signal value for the FC-CVT 15 is generated in response to that output of the FCV and sent to the second shutdown system 200, so that signals SDNU to SDNX each having a shutdown signal value for the U-, V-, W- and X-phases of the FC-CVT 15, respectively, are accordingly output to the respective U-, V-, W- and X-phases, thereby stopping the operation of the FC-CVT 15.

As described above, in the case where a failure is detected in the BAT-CVT 22 as well, not only the operation of the BAT-CVT 22, the drive IVT 16 and the auxiliary device IVT 17, which belong to the control target group 42, is stopped simultaneously, but also the operation of the FC-CVT 15, which belongs to the other control target group 41, is stopped simultaneously, and as a result, any concurrent failure can be suppressed.

<OVH>

In the first shutdown system 100, if an input voltage to the drive IVT 16 becomes equal to or greater than a predetermined threshold, i.e., if an overvoltage abnormality is detected in the drive IVT 16, that abnormality is detected by the PCU-IPM 110 and, in response to the detection of the abnormality, a signal OVH having a shutdown signal value is output.

Upon the output of the shutdown signal OVH, shutdown signals MSDN, GSDN and CSDN are output. After that, the simultaneous stopping action of the system components is the same as in the above-described case where a failure is detected in the BAT-CVT 22 (see the <FCV> section above) and thus, the description of the action in this case and the effects thereof will be omitted.

<OVL>

In the first shutdown system 100, if an input port voltage of the BAT-CVT 22 becomes equal to or greater than a predetermined threshold, i.e., if an overvoltage abnormality is detected in the BAT-CVT 22, that abnormality is detected by the PCU-IPM 110 and a signal OVL having a shutdown signal value is output in response to the detection of the abnormality.

Upon the output of the shutdown signal OVL, shutdown signals MSDN, GSDN and CSDN are output. After that, the simultaneous stopping action of the system components is the same as in the above-described case where a failure is detected in the BAT-CVT 22 (see the <FCV> section above) and thus, the description of the action in this case and the effects thereof will be omitted.

<FCVU>

Next, the case where a failure occurs in the U-phase of the FC-CVT 15 in the second shutdown system 200 will be described. In that case, the failure is detected by the FDC-IPM 210 and a signal FCVU having a shutdown signal value is output in response to the detection of the failure in the U-phase of the FC-CVT 15.

Upon the output of the shutdown signal FCVU, signals SDNU, SDNV, SDNW and SDNX each having a shutdown signal value for the U-, V-, W- and X-phases of the FC-CVT 15, respectively, are output and these shutdown signals SDNU, SDNV, SDNW and SDNX are output to the U-, V-, W- and X-phases of the FC-CVT 15, respectively, thereby stopping the operation of all phases of the FC-CVT 15.

It should be noted that although the signal lines shown in FIG. 2 do not include signal lines in terms of software, the C-CTRL 31 is configured to shut down the U- to X-phases also in terms of software when the shutdown signal FCVU is output.

If the shutdown signal FCVU is output in the second shutdown system 200, a signal ISDN having a shutdown signal value for the control target group 42 is generated in response to that output of the signal FCVU, and sent to the first shutdown system 100. In response, in the first shutdown system 100, signals MSDN and GSDN each having a shutdown signal value for the drive motors 13 and 14, respectively, are generated. The generated shutdown signals MSDN and GSDN are output to the drive IVT 16 and the auxiliary device IVT 17, respectively, thereby stopping the operation of the drive motors 13 and 14.

At that time, a signal CSND having a shutdown-cancel signal value is output to the BAT-CVT 22.

As described above, if a failure is detected in the U-phase of the FC-CVT 15, not only the operation of all phases of the FC-CVT 15, which belongs to the control target group 41, is stopped simultaneously, but also the operation of the drive IVT 16 and the auxiliary device IVT 17, which belong to the other control target group 42, is stopped simultaneously, and as a result, any concurrent failures can be suppressed.

In the above simultaneous stopping, only the BAT-CVT 22 is exempted from such simultaneous stopping. Specifically, only the BAT-CVT 22 will be stopped after a predetermined time has passed from the timing of the above simultaneous stopping. As a result, it is possible to control counter electromotive voltage, which may occur after the drive IVT 16 and the auxiliary device IVT 17 stop simultaneously, by using the BAT-CVT 22 and to thereby suppress any failure of semiconductor devices due to such counter electromotive voltage.

<FCW, FCVW, FCVX>

If a failure is detected in any of the other phases (the V-, W- and X-phases) of the FC-CVT 15 in the second shutdown system 200, that failure is also detected by the FDC-IPM 210 and a signal FCVV (V-phase), FCVW (W-phase) or FCVX (X-phase) having a shutdown signal value is output as a failure detection signal corresponding to the faulty phase.

Upon the output of any of the shutdown signals FCW to FCVX, shutdown signals SDNU, SDNV, SDVW and SDNX are output. Other than the above, the simultaneous stopping action of the system components and the shutdown action in terms of software are the same as in the above-described case where a failure is detected in the U-phase (see the \<FCVU\> section above) and thus, the description of the action in this case and the effects thereof will be omitted here.

\<FLVL\>

In the second shutdown system 200, if the FC-CVT 15 has an input port voltage equal to or less than a predetermined threshold, i.e., if a low voltage abnormality is detected in the FC-CVT 15, a signal FLVL having a shutdown signal value is output in response to that detection of the abnormality.

Figure 4:
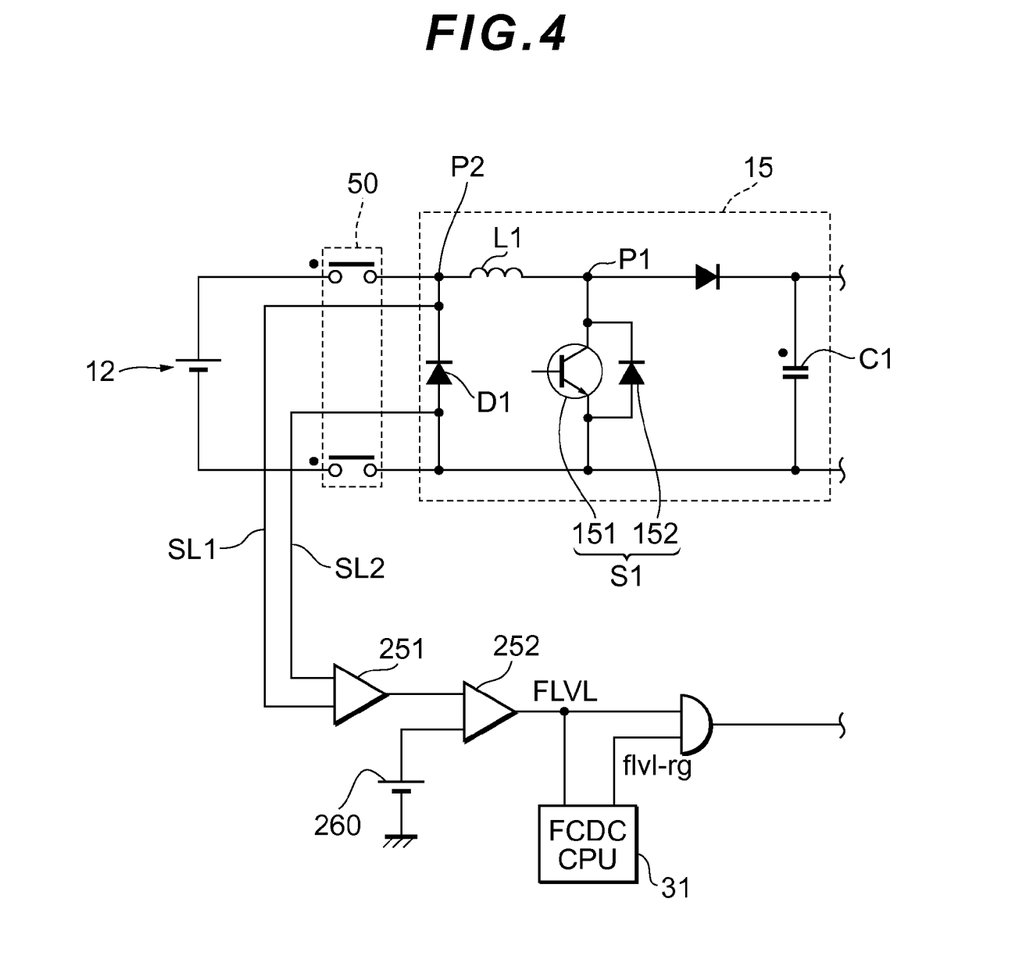
FIG. 4 is a diagram explaining a lower limit voltage cut-off circuit for outputting an FLVL.

Now, a lower limit voltage cut-off circuit for outputting such signal FLVL and the effects of the circuit will be described below with reference to FIG. 4. It should be noted that, for convenience of description, FIG. 4 illustrates only a single phase (e.g., U-phase), although the FC-CVT 15 in the present embodiment is a so-called multi-phase converter, as already explained above.

The U-phase (and the other phases as well) has an inductor L1, a switching device S1 and a reflux diode D1. As illustrated, the switching device S1 is composed of a semiconductor device 151, such as insulated gate bipolar transistors (IGBTs), other bipolar transistors and field effect transistors (FETs), and a diode 152 connected to the semiconductor device 151.

One end of the switching device S1 in the U-phase is connected to one end of the inductor L1 at a connection node P1. The other end of the inductor L1 is connected to one end of the reflux diode D1 at a connection node P2. The other end of the inductor L1 and the one end of the reflux diode D1 are connected to the cathode of the FC12 via a relay 50.

The one end of the inductor L1 and the one end of the switching device S1 are connected to one end of a smoothing capacitor C1. The other end of the smoothing capacitor C1, the other end of the switching device S1 and the other end of the reflux diode D1 are connected to the anode of the FC 12 via the relay 50.

Signal lines SL1 and SL2 for obtaining an input port voltage of the FC-CVT 15 are connected to the one end and the other end of the reflux diode D1, respectively.

A first circuit 251 calculates an input port voltage of the FC-CVT 15 by obtaining the difference between the potential signal from the signal line SL1 and the potential signal from the signal line SL2.

A second circuit 252 calculates the difference between the obtained input port voltage of the FC-CVT 15 and a predetermined lower limit voltage threshold (potential at the cathode of a power source 260) (in other word, the second circuit 252 compares them as to which value is greater).

If the input port voltage of the FC-CVT 15 is below the lower limit voltage threshold, a signal FLVL having a shutdown signal value is output from the second circuit 252, and otherwise, a signal FLVL having a shutdown-cancel signal value is output.

Referring back to FIG. 2, when a shutdown signal FLVL is output in the second shutdown system 200, a signal ISDN having a shutdown signal value for the control target group 42 is generated in response to the output of the FLVL, and the generated signal is sent to the first shutdown system 100. In response, in the first shutdown system 100, signals MSDN and GSDN each having a shutdown signal value for the drive motors 13 and 14, respectively, are generated and the generated signals MSDN and GSDN are output to the drive IVT 16 and the auxiliary device IVT 17, respectively, thereby stopping the operation of the drive motors 13 and 14.

At that time, a signal CSND having a shutdown-cancel signal value is output to the BAT-CVT 22.

Upon the output of the shutdown signal FLVL, shutdown signals SDNU, SDNV, SDVW and SDNX are output. Other than the above, the simultaneous stopping action of the system components and the shutdown action in terms of software are the same as in the above-described case where a failure is detected in the U-phase of the FC-CVT 15 (see the \<FCVU\> section above) and thus, the description of the action in this case and the effects thereof will be omitted here.

\<FOVH\>

In the second shutdown system 200, if the FC-CVT 15 has an output port voltage equal to or greater than a predetermined threshold, i.e., an overvoltage abnormality is detected in the FC-CVT 15, a signal FOVH having a shutdown signal value is output in response to the detection of that abnormality.

Upon the output of the shutdown signal FOVH, shutdown signals SDNU, SDNV, SDNW and SDNX are output. Other than the above, the simultaneous stopping action of the system components and the shutdown action in terms of software are the same as in the above-described case where a failure is detected in the U-phase of the FC-CVT 15 (see the \<FCVU\> section above) and thus, the description of the action in this case and effects thereof will be omitted here.

As describe above, after the action of the first shutdown system 100 and the second shutdown system 200, all of the major system components for the operation of the FC system 11 stop the operation thereof. If the FC system remains in that state, the vehicle may fail on the road.

In view of the above, once the system components have been safely stopped by the above-described shutdown action to thereby avoid any concurrent failures, the FC system 11 should be restarted in an optimal manner by specifying the content of the failure (abnormality), so as to thereby allow the fail-safe driving (driving for retreat) of the vehicle.

Now, the processing for selecting an optimal pattern of the fail-safe driving according to the content of the failure (abnormality) and returning the vehicle to a state ready for driving will be described below.

\<FCVU to FCVX\>

If a failure signal output in the second shutdown system 200 is any of the shutdown signals FCVU to FCVX, in other words, if a failure is detected in any of the U- to X-phases of the FC-CVT 15, whether the failure is caused by an overcurrent abnormality, an overheat abnormality, or a circuit abnormality (e.g., short-circuiting) is judged by the C-CTRL 31.

As a typical example, the case where a failure has occurred in the U-phase (particular phase) will be described.

If it is detected that the current value of the U-phase (the current value of the reactor L1 in the U-phase) has a value equal to or greater than a predetermined upper limit current threshold and that the state has continued for a predetermined time, the U-phase is judged as having an overcurrent abnormality.

If the cause of the failure in the U-phase is not an overcurrent abnormality and if it is detected that the temperature of the U-phase (the temperature of the IGBT in the U-phase) has a value equal to or greater than a predetermined upper limit temperature threshold and that the state has continued for a predetermined time, the U-phase is judged as having an overheat abnormality.

If the cause of the failure in the U-phase is neither an overcurrent abnormality nor an overheat abnormality, and if the failure condition has continued for a second predetermined time, the U-phase is judged as having a circuit abnormality.

The cause of the failures in the V-, W- and X-phases will also be judged in the same process as that described above regarding the U-phase.

(1) Overcurrent Abnormality

<<Retry Mode>>

If the failure is caused by a first-time overcurrent abnormality and if the FDC-IPM 210 detects that the overcurrent abnormality has been resolved, a shutdown-cancel signal FCVU is output. Then, the first shutdown system 100 receives a signal ISDN having a shutdown-cancel signal value from the second shutdown system 200 and, in response, signals MSDN and GSDN each having a shutdown-cancel signal value are output to the drive IVT 16 and the auxiliary device IVT 17, respectively.

Meanwhile, in the second shutdown system 200, signals SDNU, SDNV, SDNW and SDNX each having a shutdown-cancel signal value are output to the U- to X-phases, respectively. In addition, when a predetermined diagnosis time, which will be described later, has passed after the output of the shutdown signal FCVU, the C-CTRL 31 cancels the shutdown of the U- to X-phases in terms of software.

As described above, if the failure of the FC-CVT 15 is caused by an overcurrent abnormality and if it is a first-detected overcurrent abnormality, in other words, if the overcurrent abnormality is one detected for the first time after the start of the FC system 11, the drive IVT 16, the auxiliary device IVT 17 and the FC-CVT 15, which have been in the operation stopping state, are restarted under the same conditions as those in the normal operation and return to a state ready for normal driving.

The above return action also applies to the case where an overcurrent abnormality occurs in the V-, W-, or X-phase. That is, if the failure of the FC-CVT 15 is caused by an overcurrent abnormality in any phase other than the U-phase and if the overcurrent abnormality is one detected in that phase for the first time after the start of the FC system 11, the drive IVT 16, the auxiliary device IVT 17 and the FC-CVT 15, which have been in the operation stopping state, are restarted under the same conditions as those in the normal operation and return to a state ready for normal driving.

<<Specific Phase's Step-up Prohibiting Mode>>

On the other hand, if the failure of the FC-CVT 15 is caused by, for example, an overcurrent abnormality in the U-phase and if the overcurrent abnormality is one detected in the U-phase for the second or any subsequent time after the start of the FC system 11, different processing from that performed in the first detection is performed, as described below.

That is, in the second or any subsequent detection, although signals ISDN, MSDN and GSDN as well as signals SDNU to SDNX each having a shutdown-cancel signal value have been output in the same way as in the first detection, from among the U- to X-phases, which are shut down in terms of software, the software shutdown of the U-phase is not cancelled but maintained while the software shutdown of the V- to X-phases are cancelled (prohibition of step-up operation in the U-phase).

As a result, while the U-phase of the FC-CVT 15 is maintained in the operation stopping state, all of the other phases (V-, W- and X-phases), the drive IVT 16 and the auxiliary device IVT 17 are restarted and return to a state ready for driving. Here, since the FC-CVT 15 activates only three of the four phases, the above return has an output limitation of 75% (=three phases/four phases×100%) based on the maximum output during the normal operation.

The above return action also applies to the case where an overcurrent abnormality occurs in the V- W- or X-phase. In other words, if the failure of the FC-CVT 15 is caused by an overcurrent abnormality in a phase other than the U-phase and if the overcurrent abnormality is one detected in that phase for the second or any subsequent time after the start of the FC system 11, that particular phase is maintained in the operation stopping state, while all of the other phases, the drive IVT 16 and the auxiliary device IVT 17 are restarted and return to a state ready for driving.

When a failure detection signal, namely, any of shutdown signals FCVU to FCVX or a shutdown signal FLVL or FOVH, is output, the C-CTRL 31 in the present embodiment performs failure diagnosis so as to determine the existence of the failure. If the C-CTRL 31 detects that the failure condition still continues even after a predetermined diagnosis time (e.g., 0.2 seconds) has passed after the start of the failure diagnosis, i.e., after the detection of the output of the failure detection signal, the C-CTRL 31 determines that the failure really exists.

As already described above, if, for example, a shutdown signal FCVU is output in the second shutdown system 200, the operation of all phases in the FC-CVT 15 is temporarily stopped. For example, if the failure in the U-phase is caused by an overcurrent abnormality as described above, there is a possibility that the U-phase will be recovered to a normal condition in terms of hardware even before the predetermined diagnosis time has passed, i.e., even before the completion of the failure diagnosis. In that case, the FC-CVT 15 and other components, which are in the operation stopping state, will be shifted to a state ready for restart.

However, from the viewpoint of improving the reliability of the FC system 11 to therefore improve the reliability of the FC vehicle, it is preferable to provide certain measures in terms of software so that even if the FC-CVT 15, etc., is shifted to a state ready for restart in terms of hardware, the FC-CVT 15, etc., cannot be restarted until the failure diagnosis by the C-CTRL 31 has been completed.

For example, until the above-mentioned predetermined diagnosis time has passed from the output of a shutdown signal FCVU and the failure diagnosis has been completed (the diagnosis result has been determined), the C-CTRL 31 prohibits the restart of the FC-CVT 15, etc., in terms of software and the I-CTRL 32 prohibits the restart of the drive IVT 16, etc., in terms of software, even if signals SDNU to SDNX, MSDN and GSDN each having a shutdown-cancel signal value are output in terms of hardware to the U- to X-phases, the drive IVT 16 and the auxiliary device IVT 17, respectively.

Then, after the completion of the failure diagnosis, the C-CTRL 31 permits the restart of the FC-CVT 15 in terms of software and the I-CTRL 32 permits the restart of the drive IVT 16 and the auxiliary device IVT 17 in terms of software.

The above-described restart prohibition control in terms of software, which is performed when restarting the drive IVT 16, the auxiliary device IVT 17 and the FC-CVT 15, which have been in the operation stopping state, under the same conditions as those in the normal operation or under conditions with an output limitation so as to shift them to a state ready for driving, is similarly performed when an overcurrent abnormality occurs in the V-, W- and X-phases.

(2) Overheat Abnormality

<<Specific Phase's Step-up Prohibiting Mode>>

If a failure signal output in the second shutdown system 200 is any of the shutdown signals FCVU to FCVX, in other words, if a failure is detected in any of the U- to X-phases of the FC-CVT 15, and if the failure is caused by an overheat abnormality, the same processing as that in the <<Specific Phase's Step-up Prohibiting Mode>> in the (1) Overcurrent Abnormality section above is performed.

For example, if an overheat abnormality occurs in the U-phase, signals ISDN, MSDN and GSDN each having a shutdown-cancel signal value are output and, after that, from among the U- to X-phases which are currently shut down in terms of software, the software shutdown of the U-phase alone is maintained (prohibition of step-up operation in the U-phase), while the software shutdown of the V- to X-phases is cancelled.

As a result, while the U-phase of the FC-CVT 15 is maintained in the operation stopping state, all of the other phases (V-, W- and X-phases), the drive IVT 16 and the auxiliary device IVT 17 are restarted and return to a state ready for driving more quickly and securely. Here, since the FC-CVT 15 activates only three of the four phases, the above return has an output limitation of 75% (=three phases/four phases×100%) based on the maximum output during the normal operation.

The above return action also applies to the case where an overheat abnormality occurs in any of the V- W- and X-phases, except that the phase that is maintained in the operation stopping state is the phase having the overheat abnormality.

(3) Circuit Abnormality 1

<<Specific Phase's Step-up Prohibiting Mode>>

If a failure signal output in the second shutdown system 200 is any of the shutdown signals FCVU to FCVX, in other words, if a failure is detected in any of the U- to X-phases of the FC-CVT 15, and if the failure is caused by a circuit abnormality (e.g., short-circuiting), the same processing as that performed in the case of "(2) Overheat Abnormality" above is performed, so as to return to a state ready for driving although the return has an output limitation of 75% based on the maximum output during the normal operation.

<FLVL>

If a failure signal output in the second shutdown system 200 is a shutdown signal FLVL, whether the failure is caused by a circuit abnormality (e.g., short-circuiting) or by a low voltage abnormality is first judged by the C-CTRL 31.

For example, if it is detected that the input port voltage of the FC-CVT 15 has a value equal to or lower than a predetermined lower limit voltage threshold and that the state has continued for a predetermined time, the FC-CVT 15 is judged as having a low voltage abnormality.

Further, if the abnormality in the FC-CVT 15 is not a low voltage abnormality, and if the failure condition has continued for a second predetermined time, which is longer that the above-described predetermined time, the FC-CVT 15 is judged as having a certain circuit abnormality in the circuit on the input port side thereof.

(1) Circuit Abnormality 2

<<EV Driving>>

If the failure is caused by a circuit abnormality, signals ISDN, MSDN, GSDN and CSDN each having a shutdown-cancel signal value are output when the above-described predetermined diagnosis time has passed after the detection of the circuit abnormality, i.e., after the completion of the failure diagnosis; whereas, the current shutdown setting of the U- to X-phases in terms of software is not cancelled but maintained (prohibition of step-up operation in all phases). After that, the FC relay 50 disposed between the FC 12 and the FC-CVT 15 is disconnected.

As described above, if a circuit abnormality is detected in the circuit on the input port side of the FC-CVT 15, a power supply from the FC 12 is blocked but the drive IVT 16 and the auxiliary device IVT 17, which have been in the operation stopping state, resume the operation thereof and return to a state ready for so-called EV driving, i.e., driving only with power supplied from the BAT 20.

(2) Low Voltage Abnormality

<<EV Driving>>

If a failure signal output in the second shutdown system 200 is a shutdown signal FLVL and if the failure is caused by a low voltage abnormality, the same processing as that performed in the case of "(1) Circuit Abnormality 2" above is performed. Although the power supply from the FC 12 is blocked, the drive IVT 16 and the auxiliary device IVT 17, which have been in the operation stopping state, resume the operation thereof and return to a state ready for so-called EV driving, i.e., driving only with power supplied from the BAT 20.

<FOVH>

If a failure signal output in the second shutdown system 200 is a shutdown signal FOVH, whether the failure is caused by a circuit abnormality (e.g., short-circuiting) or by an overvoltage abnormality is first judged by the C-CTRL 31.

For example, if it is detected that the output port voltage of the FC-CVT 15 has a value equal to or greater than a predetermined upper limit voltage threshold and that the state has continued for a predetermined time, the FC-CVT 15 is judged as having an overvoltage abnormality.

Further, if the abnormality in the FC-CVT 15 is not an overvoltage abnormality and if the failure condition continues for a second predetermined time which is longer than the above-described predetermined time, the FC-CVT 15 is judged as having a certain circuit abnormality in the circuit on the output port side thereof.

(1) Circuit Abnormality 3

<<FC-CVT Stop Driving>>

If the failure is caused by a circuit abnormality, signals ISDN, MSDN and GSDN each having a shutdown-cancel signal value are output when the above-described predetermined diagnosis time has passed after the detection of the circuit abnormality, i.e., after the completion of the failure diagnosis; whereas, the current shutdown setting of the U- to X-phases in terms of software is not cancelled but maintained (prohibition of step-up operation in all phases).

As described above, if a circuit abnormality is detected in the circuit on the output port side of the FC-CVT 15, the FC-CVT 15 is maintained in the operation stopping state but the drive IVT 16 and the auxiliary device IVT 17, which have been in the operation stopping state, resume the operation thereof and return to a state ready for driving with power supplied from the FC 12 and/or the BAT 20.

(2) Overvoltage Abnormality

<<EV Driving>>

If a failure signal output in the second shutdown system 200 is a shutdown signal FOVH and if the failure is caused by an overvoltage abnormality, signals ISDN, MSDN, GSDN and CSDN each having a shutdown-cancel signal value are output when the above-described predetermined diagnosis time has passed after the detection of the overvoltage abnormality, i.e., after the completion of the failure diagnosis; whereas, the shutdown of the U- to X-phases in terms of software is not cancelled but maintained (prohibition of step-up operation in all phases).

After that, the FC relay 50 disposed between the FC 12 and the FC-CVT 15 is disconnected.

As described above, if an overvoltage abnormality is detected in the FC-CVT 15, the power supply from the FC 12 is blocked, but the drive IVT 16 and the auxiliary device IVT 17, which have been in the operation stopping state, resume the operation thereof and return to a state ready for so-called EV driving, i.e., driving only with power supplied from the BAT 20.

As described in the foregoing, according to the embodiment described above, even after a failure in one system component causes the simultaneous stopping (shutdown) of the other system components, the system can be restarted with system components having no failures by specifying the system component having the failure and the cause of the failure.

Accordingly, a vehicle in which the FC system 11 is installed can avoid any concurrent failures of the system components and, at the same time, at least the fail-safe driving of the vehicle is possible even after such avoidance.

The above-described embodiment describes an example in which the I-CTRL 32 (second controller) is physically composed of one controller and the drive IVT 16 (first inverter), the auxiliary device IVT 17 (second inverter) and the BAT-CVT 22 (second converter) are controlled by the one controller; however, the present invention is not limited to the example.

For example, a controller may be provided for each of the first inverter, the second inverter and the second converter and these three controllers may be connected to constitute the second controller.

Alternatively, a controller for controlling one of the first inverter, the second inverter and the second converter, and a controller for controlling the remaining two of the above may be connected to constitute the second controller.

In addition, although the above-described embodiment describes an example in which the FC system according to the present invention is installed in an FC vehicle, the FC system according to the present invention can also be applied to various moving objects (robots, ships, airplanes, etc.) other than FC vehicles. Further, the FC system according to the present invention can be applied to a stationary power generation system to be used as power generation equipment for buildings (houses, office buildings, etc.).

What is claimed is:

1. A fuel cell system comprising:
  a fuel cell and a secondary battery, each acting as a power supply source;
  a first converter and a second converter provided between the fuel cell and the secondary battery and first and second loads;
  a first inverter provided between the first and second converters and the first load and a second inverter provided between the first and second converters and the second load;
  a first controller that controls an output of the fuel cell by controlling the first converter; and
  a second controller configured separately from the first controller, the second controller controlling the second converter, the first inverter and the second inverter to thereby control outputs supplied to the first inverter and the second inverter, including an output from the secondary battery,
  wherein the first controller and the second controller are connected so as to be able to communicate with each other regarding failure information on respective control targets, and
  wherein if one of the first controller and the second controller receives the failure information sent from the other, operation of the control target of the first controller or the second controller that has received the failure information is stopped,
  wherein, if a failure is detected in any of the first converter, the second converter, the first inverter or the second inverter, the first controller and the second controller are programmed to:
  stop the operation of the first converter, the second converter, the first inverter and the second inverter if the failure is detected in the second converter; and
  stop the operation of the first converter, the first inverter and the second inverter if the failure is detected in any of the first converter, the first inverter or the second inverter, and then stop the operation of the second converter after a predetermined time has passed from the stop of the operation of the first converter, the first inverter and the second inverter.

2. The fuel cell system according to claim 1, comprising a judgment part that judges a cause of the failure,
  wherein the first controller and the second controller restart at least one of the first converter, the second converter, the first inverter and the second inverter based on a result of judgment by the judgment part.

3. The fuel cell system according to claim 2,
  wherein the first converter is a multi-phase converter comprising a step-up circuit part having two or more phases, and
  wherein the first controller and the second controller restart the first converter, the second converter, the first inverter and the second inverter if a failure in the first converter is caused by an overcurrent abnormality in a particular phase and if the abnormality is a first-time overcurrent abnormality.

4. The fuel cell system according to claim 2,
  wherein the first converter is a multi-phase converter comprising a step-up circuit part having two or more phases, and
  wherein the first controller and the second controller restart all phases of the first converter excluding a particular phase, the second converter, the first inverter and the second inverter if a failure in the first converter is caused by an overcurrent abnormality in the particular phase and if the abnormality is a second or subsequent time overcurrent abnormality.

5. The fuel cell system according to claim 2,
  wherein the first converter is a multi-phase converter comprising a step-up circuit part having two or more phases, and
  wherein the first controller and the second controller restart remaining phases other than a particular phase in the first converter, the second converter, the first inverter and the second inverter if a failure in the first converter is caused by an overheat abnormality or a circuit abnormality in the particular phase.

6. The fuel cell system according to claim 2,
  wherein the first controller and the second controller restart the second converter, the first inverter and the second inverter if a failure in the first converter is caused by a circuit abnormality in a circuit on an output port side of the first converter.

7. The fuel cell system according to claim 2,
  wherein, if a failure in the first converter is caused by any of an overvoltage abnormality on an output port side of the first converter, a low voltage abnormality on an input port side of the first converter, or a circuit abnormality in a circuit on the input port side of the first converter, the first controller and the second controller block an output from the fuel cell to the first and second loads and thereafter restart the second converter, the first inverter and the second inverter.

8. The fuel cell system according to claim 3,
wherein the first controller performs failure diagnosis for determining the existence of the failure, and
wherein the first controller and the second controller prohibit the restart until the failure diagnosis has been completed.

9. The fuel cell system according to claim 4,
wherein the first controller performs failure diagnosis for determining the existence of the failure, and
wherein the first controller and the second controller prohibit the restart until the failure diagnosis has been completed.

10. The fuel cell system according to claim 5,
wherein the first controller performs failure diagnosis for determining the existence of the failure, and
wherein the first controller and the second controller permit the restart after completion of the failure diagnosis.

11. The fuel cell system according to claim 6,
wherein the first controller performs failure diagnosis for determining the existence of the failure, and
wherein the first controller and the second controller permit the restart after completion of the failure diagnosis.

12. The fuel cell system according to claim 7,
wherein the first controller performs failure diagnosis for determining the existence of the failure, and
wherein the first controller and the second controller permit the restart after completion of the failure diagnosis.

* * * * *